United States Patent  
Daimer et al.

[15] 3,668,098  
[45] June 6, 1972

[54] COATING COMPOSITIONS

[72] Inventors: Wolfgang Daimer; Heinrich Lackner, both of Graz, Austria

[73] Assignee: Vianova Kunstharz Aktiengesellschaft, Wien, Austria

[22] Filed: Nov. 13, 1968

[21] Appl. No.: 775,531

[30] Foreign Application Priority Data

Nov. 20, 1967 Austria .......................... A 10401/67

[52] U.S. Cl. .......................... 204/181, 260/18 R, 260/22 T, 260/29.2 R, 260/404.8, 106/222, 106/252
[51] Int. Cl. ........................................ B01k 5/00, C23b 13/00
[58] Field of Search .................. 204/181; 260/29.6 H, 18 CL, 260/22 T

[56] References Cited

UNITED STATES PATENTS

| | | | |
|---|---|---|---|
| 3,364,162 | 1/1968 | Huggard | 260/22 |
| 3,230,162 | 1/1966 | Gilchrist | 204/181 |
| 3,366,563 | 1/1968 | Hart et al. | 204/181 |
| 3,428,589 | 2/1969 | Coats | 204/181 X |
| 3,471,389 | 10/1969 | Swanson | 204/181 |

Primary Examiner—Daniel E. Wyman  
Assistant Examiner—W. J. Shine  
Attorney—Alfred W. Breiner

[57] ABSTRACT

A water-dilutable coating composition particularly adaptable for electro-deposition comprising water, a water-miscible solvent, and an ammonia or amine soap of a condensation product of an adduct of an $\alpha,\beta$-ethylenically unsaturated dicarboxylic acid and an ester of a hydroxyl-free drying or semi-drying oil, unmodified or modified with rosin, is described. The condensation product will comprise from 10 to 25 percent by weight of a dienophilic compound, 75 to 90 percent by weight of the hydroxyl-free ester of a drying or semi-drying oil prepolymerized to a viscosity 3 to 30 times its initial value.

10 Claims, No Drawings

COATING COMPOSITIONS

FIELD OF THE INVENTION AND PRIOR ART

This invention is directed to improve coating compositions. More particularly, the invention is directed to water-dilutable coating compositions which are particularly adapted for application to an object by electro-deposition techniques.

U.S. Pat. No. 3,230,162 and Austrian Pat. No. 244,910 corresponding substantially to the designated U.S. Patent describe the coating of objects with a water-dilutable coating composition by electro-deposition techniques. In the procedure used, the object to be coated serves as the anode of the electro-deposition cell. The water-dilutable compositions employed are adducts of a drying oil and maleic anhydride subsequently co-polymerized with, for example, vinyl toluene, thereafter reacted with a non-heat-reactive phenolic resin, and finally the anhydride groups of the adduct are hydrolyzed and the condensate at least partially neutralized by the addition of alkanolamines or diamines. The co-polymerization is said to reduce the water sensitivity of the deposited films and to increase the electrical resistance of the bath. The reaction with the non-heat-reactive phenolic resin serves to extend the polycarboxylic acid resin and to increase the molecular weight of the condensate providing a film with greater hardness. The amines used for neutralizing the carboxyl groups and thereby producing water-soluble resins are hydroxy amines, polyamines, and monoamines. Under the conditions of the neutralization, these amines remain in the deposited films ad serve as cross-linking components during the hardening of the films at elevated temperatures. Although these compositions are satisfactory for many applications, the manufacture of the condensates is complex with the resultant compositions having various shortcomings including being relatively unstable. As a result of the instability, the electro-deposition bath becomes fouled during application of the composition, particularly when pigments and/or fillers are admixed therein.

OBJECTS AND GENERAL DESCRIPTION OF INVENTION

Accordingly, it is an object of the present invention to provide improved coating compositions particularly adapted for application by electro-deposition techniques.

It is another object of this invention to provide coating compositions particularly adapted for application by electro-deposition techniques which are stable over a wide temperature range when in concentrated form as well as when diluted with water and water-miscible solvents.

It is a further object of this invention to provide improved coating compositions particularly adaptable for electro-deposition techniques which have excellent pigment wetting capacity which enables the co-employment of large amounts of pigments, fillers, and extenders without disturbing the stability of the electro-deposition bath.

It is another object of this invention to provide coating compositions particularly adapted for application by electro-deposition techniques having outstanding flow properties during stoving.

It is another object of this invention to provide improved coating compositions particularly adaptable for application by electro-deposition techniques which permit the deposition of the coatings at pH-values in the range of from about 6.0 to 8.0, thereby reducing the hazard of alkali saponification of the coating composition.

It is still a further object of this invention to provide improved coating compositions particularly adaptable for application by electro-deposition techniques providing coatings which are characterized by uniform deposition, excellent adhesion, hardness and flexibility, and which have excellent corrosion resistance.

These and other objects of the invention will be more fully apparent from the following detailed description and preferred embodiments.

According to the present invention, it has been found that electro-deposited films with greatly improved properties can be obtained by employing coating compositions comprising water, water-miscible or water-tolerant solvents preferably being free of primary hydroxyl groups, and an ammonia or amine soap of a condensation product of an adduct of an $\alpha\beta$-ethylenically unsaturated dicarboxylic acid and an ester or a hydroxyl-free drying or semi-drying oil unmodified or modified with rosin. The condensation product will comprise from 10 to 25 percent and preferably 15 to 20 percent by weight of a dienophilic compound, 75 to 90 percent and preferably 80 to 85 percent by weight of the hydroxyl-free drying and semi-drying oil ester which has been prepolymerized to a viscosity 3 to 30 times and preferably 3 to 10 times its initial value. The improved coating compositions prepared as above can be made by simple manufacturing procedures and, furthermore, have excellent stability in concentrated form as well as when diluted with water and/or a water-miscible solvent even under the influence of wide temperature fluctuations. Additionally, the compositions have excellent throwing power. Other advantages of the coating compositions reside in their outstanding flow properties during stoving which is apparently due to the predominant proportion of long-chained fatty acid moieties. Additionally, the compositions have excellent pigment wetting capacity which enables the co-employment of large proportions of cheap pigments, fillers, and extenders which heretofore could only be used in small quantities, if at all, since such pigments, fillers, and extenders disturbed the stability of the electro-deposition baths. The compositions are highly soluble in water, permitting their utility in electro-deposition baths operated at pH-values in the range of from 6.0 to 8.0 measured in a 10 percent solution of the resin and distilled water. Since it is possible to electro-deposit the compositions at pH-values of below 7.0, the hazard of alkali saponification of the ester linkage and, thus, partial breakdown of the macromolecules during continuous deposition is avoided. The preferred pH working range with the improved compositions is from 6.5 to 7.5. The coatings electro-deposited from the described coating compositions are uniform, adhere well, and have excellent hardness and flexibility, as well as excellent corrosion resistance. The superior corrosion resistance of the films of the coating compositions of the invention is demonstrated in comparative tests with known methods and products (see Example 7 hereinafter). This superiority is due to the fact that a maximum of double linkages is obtained in the molecule of the size required, which double linkages during deposition apparently are subject to hydroperoxidation, epoxidation, or hydroxylation through the oxygen atoms liberated at the anode. Thus, additional cross-linking with the carboxy groups takes place. In the coating compositions of the prior art, these reactive positions are blocked by co-polymerization or extension. Upon saponification of the films, e.g., in an alkaline medium, the molecules of the presently described compositions are not broken down to relatively small pieces, as is the case, if low molecular products are linked with, e.g., alkanolamines or polyamines.

The water-tolerant or water-miscible solvents employed herein include the ketones, such as acetone, menthyl ethyl ketone; tertiary alcohols, such as tert. butanol, tert. pentanol, diacetone alcohol; ethers, such as tetrahydrofurane, dioxane, and dioxyalkyl derivatives of glycols, e.g., diethylene glycol diethyl ether, etc. Furthermore, dimethylsulfoxide and dimethylformamide can be employed. Subordinate proportions of secondary alcohols, such as isopropanol, sec. butanol, 1-butoxypropanol-2, dipropylene glycol, cyclohexanol, can be used, however, it is preferred not to use primary hydroxyl-containing compounds.

Fatty acid esters suitable for preparing the condensation product suitable for use herein are the hydroxy-free esters of polyols including ethylene glycol, propylene glycol, 2,2-dimethylpropane diol-1,3,glycerol, trimethylolethane, trimethylolpropane, pentaerythritol, optionally hydroxy groups containing polymers with straight chain or branched monocarboxylic acids having from eight to 24 carbon atoms, with isolated or conjugated double bonds. Natural drying or semi-drying oils, such as linseed oil, soya bean oil, tung oil, sunflower oil, safflower oil, cotton seed oil, oiticica oil, perilla oil and their isomerized derivatives are preferred. Mixtures of the aforesaid oils with dehydrated castor oil are specially preferred. Furthermore, hydroxy-free mixed esters of the aforesaid monocarboxylic acids, in conjunction with rosin acids of colophony and tall oil, can be used. The rosin acids should account for no more than about 30 percent by weight of the amount of carboxylic acids employed. Additionally, a proportional use of saturated monocarboxylic acids up to a maximum of about 20 percent is possible. Moreover, in the preparation of the mixed esters at times it may be desirable to employ subordinate amounts of non-dienophilic dicarboxylic acid, such as the isomeric phthalic acids, adipic acids, dimeric fatty acids, etc. If the fatty acid esters employed in the condensates are not natural glycerides, their preparation is carried out in known manner. In the final product a content of free hydroxy groups according to a hydroxyl number of below eight is to be understood as hydroxy-free in the sense of the present invention.

The preferred $\alpha\beta$-ethylenically unsaturated dicarboxylic acids are maleic acid, maleic anhydride, fumaric acid and itaconic acid. Through the specification and claims, reference to dicarboxylic acid shall include the corresponding anhydride if such anhydrides exist.

Suitable nitrogen bases for saponification are ammonia and the tertiary and secondary alkyl amines, such as triethyl amine, trimethyl amine, diethyl amine, diisopropylamine, dibutyl amine, morpholine, N-methylmorpholine and piperidine. The tertiary alkyl amines are preferred.

The prepolymerization of the hydroxy-free fatty acid ester or mixed ester to 3 to 30 times and preferably 3 to 10 times the value of the initial viscosity is carried out at temperatures of between 150° to 300° C. with or without the use of peroxidic initiators such as di-tertiary butyl peroxide, di-benzoyl peroxide or other operable initiators. The greater the viscosity of the ester employed, the smaller the amount of dienophilic compound which is necessary. Furthermore, at times it may be advantageous to esterify acidic decomposition products which may be formed during the polymerization with one of the above-mentioned polyols in order to re-incorporate them into the high molecular compound.

The reaction with the dienophilic component is carried out in known manner preferably at temperatures in the range of from 160° to 220° C. The reaction product upon completion will preferably have a content of free unreacted dienophilic component of less than 0.05 percent of the amount used. When using the preferred maleic anhydride as the dienophilic compound, it has been found to be of advantage to quantitatively hydrolyze the anhydride groups subsequent to adduct formation. Hydrolysis can be carried out with 1.5 times the stoichiometric amount of water, optionally co-employing a tertiary amine. The hydrolysis can be carried out in the temperature range of from 30° to 100° C. in the presence or, or absence of a solvent. Thereafter the products are neutralized at temperatures of from about 20° to 50° C., until the water solubility is sufficient for application. Further solvents can be added according to technical requirements.

The coating compositions of the invention are deposited electro-phoretically in known manner, pigmented or unpigmented, in a resin solid concentration of from about 5 to 25 percent. All pigments and extenders suitable for electro-deposition can be used.

EXAMPLES

The following examples illustrate the invention without limiting its scope. Unless otherwise stated, parts are by weight.

EXAMPLE 1

A mixture of 200 grams linseed oil and 200 grams dehydrated castor oil with an initial viscosity of 90 cP/20° C. is heated to 280° C., with inert gas, and held at this temperature until a viscosity of 500 cP/20° C. is obtained. At 200° C., 100 grams maleic anhydride are added. The temperature is held at 200° C. until the content of free maleic anhydride has fallen below 0.05 percent. 20 grams tung oil are added and the mass is held at 180° C. for 1 hour. After cooling to 100° C., the batch is diluted with 100 grams diacetone alcohol and hydrolyzed with 27 grams water and 40 grams triethyl amine at 90° C. The resin is diluted to 75 percent solids with further diacetone alcohol.

The coating composition is prepared for, and electro-deposited as follows 270 grams of the 75 percent resin solution are ground with 66 grams iron oxide red on a triple roll mill, then neutralized with 18 grams triethyl amine and diluted with water (distilled) to a total weight of 2,000 grams. The pH-value of the bath is adjusted with triethyl amine to 6.8. Then the composition is poured into a 2-liter cylindrical metal container of 15 cm diameter. The container acts as the cathode of steel electrochemical cell. A phosphated steel plate of 200 cm$^2$ surface is immerged into the bath as the anode under a direct current. At 160 volts, a tough film is deposited within 1 minute. The film is rinsed with water and hardened for 30 minutes at 180°C.; the dry film thickness is 20 microns. The film is hard, flexible, and has an excellent resistance to salt spray.

The resin has an electrochemical equivalent weight of less than 500 (measured according to the method cited in U.S. Pat. No. 3,230,162, column 3). For the continuous working in electro-deposition baths, the coating composition can be used as a 75-percent solution, as clear varnish or as a pigment paste, to replenish the bath, without triethyl amine or with small further additions of triethyl amine. In some cases the addition of anti-oxidizing agents, e.g., based on phenolic substances, has proved advantageous. In coating non-ferrous metals, the addition of heavy metal ions, e.g., $Fe^{II}$, $Fe^{III}$, $Co^{II}$, $Pb^{II}$, $Mn^{II}$, will accelerate the hardening during the stoving process.

EXAMPLE 2

A mixture of 300 grams of dehydrated castor oil, 60 grams linseed oil, 90 grams rosin, and 11 grams glycerol is esterified at 250° C. to an acid number of below 3 mg KOH/g. The viscosity of the mixed ester is 300 cP/20° C. It is polymerized at 265° C. to a viscosity of 1,000 cP/20° C. At 200° C., 100 grams maleic anhydride are added and the batch is held at 200° C., until the content of free maleic anhydride has fallen below 0.05 percent. The condensation product is diluted with 110 grams diacetone alcohol at 100° C. and hydrolyzed for two hours at 90° C. with 5 grams triethyl amine and 27 grams water. The resin is diluted with diacetone alcohol to 75 percent solids.

270 grams of the resin solution are ground with 66 grams iron oxide red on a triple roll mill, neutralized with 23 grams triethyl amine and diluted with deionized water to a total weight of 2,000 grams. The pH-value of the solution is adjusted to 7.5 with triethyl amine. The further application is carried out according to Example 1.

EXAMPLE 3

In order to demonstrate the improvement of the products of the invention over the prior art, a mixture of 300 grams dehydrated castor oil, 60 grams linseed oil, 90 grams rosin and 11 grams glycerol is esterified at 250° C., to an acid number of below 3 mg KOH/g. The mixed ester has a viscosity of 300 cP/20° C. At 200° C., 100 grams maleic anhydride are added. The batch is held at this temperature, until the content of free maleic anhydride has fallen below 0.05 percent. Within two hours at 160° C., 120 grams vinyl toluene mixed with 3 grams di-tertiary butyl peroxide are added. The reaction is completed by heating to 180° C. At 100° C., the reaction product is dissolved in 135 grams diacetone alcohol, and at 90° C., it is hydrolyzed with 27 grams water and 5 grams triethyl amine for 2 hours. The reaction product is diluted to 75 percent solids with diacetone alcohol. Processing and application was carried out according to the procedure of Example 1.

In Example 7, the product obtained is compared to the coating compositions of the present invention.

EXAMPLE 4

A mixture of 300 grams soya oil and 200 grams dehydrated castor oil, with a viscosity of 90 cP/20° C., is held at 220° C. until, while adding 0.5 grams di-tertiary butyl peroxide in intervals of two hours, the viscosity has reached 500 cP/20° C. At 200° C., 100 grams maleic anhydride are added and the temperature is held at 200° C. until the content of free maleic anhydride has fallen below 0.05 percent. At 80° C., the resin is diluted with 120 grams tert. butanol and hydrolyzed for 2 hours with 27 grams water and 30 grams triethyl amine. Further processing and application was carried out according to Example 1.

EXAMPLE 5

90 grams linseed oil, 90 grams dehydrated castor oil, 60 grams dehydrated castor oil fatty acid, 60 grams rosin and 13 grams pentaerythritol are esterified at 265 to 270° C., until the acid number falls below 10 mg KOH/g. The viscosity of the mixed ester is 100 to 110 cP/20° C. This mixed ester is prepolymerized at 280° to 285° C. until the viscosity has reached 350 to 400 cP/20° C. At 180° C., 100 grams maleic anhydride are added and the temperature then held at 190° to 195° C. until 85 to 90 percent of the maleic anhydride has reacted. Then 50 grams tung oil are added and the temperature then held at 190° to 195° C. until the content of free maleic anhydride has fallen below 0.05 percent (about 1 to 2 hours). 450 grams of the adduct obtained are mixed with a blend of 27 grams water and 1 gram triethyl amine and held at 95° to 100° C. while stirring, until no free anhydride groups can be detected in the infra-red spectrum. The resin is diluted with 63 grams diacetone alcohol and the pH-value adjusted to 6.9 to 7.1 (measured as 10 percent aqueous solution) with 40 to 45 grams diethyl amine.

For producing a pigmented paint, 450 grams of the resin solution at 83 percent non-volatile are ground with 70 grams iron oxide red on a triple roll mill. To this paste a mixture of 100 grams water and 20 grams diethyl amine is added, and it is diluted with 1,660 grams water. The pH-value is adjusted to 7.0 with diethyl amine. The paint is deposited electro-phoretically according to Example 1. The films are cured at 160° C. for 30 minutes. The films are hard, very flexible, and show good adhesion and resistance to chemical and mechanical influences.

In many cases it is possible through the addition of heavy metal salts, e.g., iron oxalate, to reduce the stoving temperatures for electro-deposited films, without diminishing the hardness. The heavy metal ions may be introduced through the pigments.

EXAMPLE 6

A mixture of 920 grams linseed oil fatty acid, 220 grams dehydrated castor oil fatty acid and 138 grams pentaerythritol is esterified at 245° to 250° C. to an acid number of below 7 mg KOH/g. The viscosity of the mixed ester is 90 to 110 cP/20° C. The ester is polymerized at 285° C. to a viscosity of 280 to 350 cP/20° C. At 200° C., 100 grams maleic anhydride are adducted to 500 grams of this ester, until the content of free maleic anhydride has fallen below 0.05 percent. At 90° C., a mixture of 25 grams water and 1 gram triethyl amine is added and the batch is held for 1 to 2 hours at 95° to 110° C. until no free anhydride groups can be detected in the infra-red spectrum. The resin is diluted with 94 grams diacetone alcohol, and neutralized with 55 to 60 grams diethyl amine to a pH-value of 7.0 to 7.2 (measured as 10 percent aqueous solution). Processing and application was carried out according to Example 5.

EXAMPLE 7

Comparison of the products of the Examples designated with a product prepared by the prior art method, i.e., Example 3, and a prior art product is as follows:

| | I | II | III | IV | V |
|---|---|---|---|---|---|
| | Flexibility | Hardness | Salt spray ASTM-B 117-61 | Deposition | Throwing power |
| Example 1 | 1 | 2 | 3 | 1 | 18 |
| Example 2 | 2 | 2 | 3 | 3 | 17 |
| Example 3 | 3 | 2 | 10 | 3 | 17 |
| Prior art [1] | 3.5-4 | 2 | (2) | 2 | 8 |

[1] Example 1 of Austrian patent No. 244,910.
[2] Completely peeled off.

Grading:
  For tests I, II, and Iv, the product was given a grade of 1 –5, with 1 being the best value.
Flexibility:
  Ball test, 1 kg from 1 m height, diameter 2 cm.
Salt Spray according to ASTM-B 117–61:
  Corrosion in mm after 170 hours.
Deposition:
  On sufficiently degreased metal.
Throwing Power:
  A plastic cylinder of 6 em diameter and one liter content with a disc cathode of 6 cm diameter at the bottom is filled with the test material. The anode, a steel strip of 5 cm width, is inserted into the cylinder. The base end of the strip has a distance of 2 cm to the cathode. The conditions for deposition are chosen such that a film thickness of 20 microns is obtained at the base end of the anode. Film thickness will diminish with increasing distance from the cathode. The distance between 20 microns and 10 microns film thickness is measured in centimeters. The longer the distance, the better the throwing power.

While various modifications of the invention are disclosed, it should be appreciated that the invention is not restricted thereto, but that other embodiments will be apparent to one skilled in the art which come within the scope and spirit of the invention and the appended claims.

We claim:
1. A water-dilutable coating composition for electrodeposition comprising (1) water, (2) a solvent miscible with water, and (3) a soap soluble in (1) and (2); said soap being a soap of a member of the group consisting of ammonia, lower alkyl amines, morpholine, n-methyl morpholine, and piperidine and a condensation product consisting essentially of a drying oil or semi-drying oil fatty acid ester or mixture thereof having a hydroxyl number of less than about eight and an α,β-ethylenically unsaturated dicarboxylic acid, said condensation product which is the sole binding agent containing 10 to 25 percent by weight of said α,β-ethylenically unsaturated compound and 75 to 90 percent by weight of said drying oil or semi-drying oil ester, said ester having been prepolymerized to an increased viscosity of 3 to 30 times its initial value.

2. The composition of claim 1 wherein the condensation product is an adduct of from 15 to 20 percent by weight maleic anhydride and 80 to 85 percent by weight of a mixture of 25 to 50 percent by weight of dehydrated castor oil and 50 to 75 percent by weight of linseed oil.

3. A water-dilutable coating composition for electro-deposition comprising (1) water, (2) a solvent miscible with water, and (3) a soap soluble in (1) and (2); said soap being a soap of a member of the group consisting of ammonia, lower alkyl amines, morpholine, n-methyl morpholine, and piperidine and a condensation product consisting essentially of (A) a drying oil or semi-drying oil fatty acid ester or mixture thereof having a hydroxyl number of less than about eight and an $\alpha\beta$-ethylenically unsaturated dicarboxylic acid, or (B) mixed esters of a drying oil or semi-drying fatty acid ester having a hydroxyl number of less than about eight with rosin acids and an $\alpha\beta$-ethylenically unsaturated dicarboxylic acid, said condensation product which is the sole binding agent containing 10 to 25 percent by weight of said $\alpha,\beta$-ethylenically unsaturated compound and 75 to 90 percent by weight of said drying oil or semi-drying ester, said ester having been prepolymerized to an increased viscosity of 3 to 30 times its initial value.

4. The composition of claim 3 wherein the condensation product contains from 15 to 20 percent by weight of said $\alpha,\beta$-ethylenically unsaturated compound and 80 to 85 percent by weight of said ester.

5. The composition of claim 4 wherein the ester has been prepolymerized to an increased viscosity of from 3 to 10 times its initial value.

6. The composition of claim 5 wherein the $\alpha,\beta$-ethylenically unsaturated acid is maleic acid.

7. The composition of claim 6 wherein the ester is made up from acids of dehydrated castor oil and linseed oil.

8. In a process for electrocoating an anode with paint in an electrical circuit comprising a bath of an aqueous medium is electrical contact with an anode and cathode, the improvement wherein said aqueous medium in said bath has a pH-value of from 6.0 to 8.0 and comprises a water-dilutable composition comprising (1) water, (2) a solvent miscible with water, and (3) a soap soluble in (1) and (2); said soap being a soap of a member of the group consisting of ammonia, lower alkyl amines, morpholine, n-methyl morpholine, and piperidine and a condensation product consisting essentially of a dry oil or semi-drying oil fatty acid ester or mixtures thereof having a hydroxyl number of less than about eight and an $\alpha,\beta$-ethylenically unsaturated dicarboxylic acid, said condensation product which is the sole binding agent containing 10 to 25 percent by weight of said $\alpha,\beta$-ethylenically unsaturated compound and 75 to 90 percent by weight of said drying oil or semi-drying oil ester, said ester having been prepolymerized to an increased viscosity of 3 to 30 times its initial value.

9. The process of claim 8 further characterized in that the condensation product is an adduct of from 15 to 20 percent by weight maleic anhydride and 80 to 85 percent by weight of a mixture of from 25 to 50 percent by weight of dehydrated castor oil acids and 50 to 75 percent by weight linseed oil acids.

10. The process of claim 9 wherein the said ester was prepolymerized in the presence of a polymerization initiator.

* * * * *